United States Patent
Whittaker et al.

(10) Patent No.: US 11,137,516 B2
(45) Date of Patent: Oct. 5, 2021

(54) SYSTEM AND METHOD FOR PASSIVE ASSAY OF HOLDUP DEPOSITS IN NUCLEAR PIPING

(71) Applicant: CARNEGIE MELLON UNIVERSITY, Pittsburgh, PA (US)

(72) Inventors: William Lawrence Whittaker, Pittsburgh, PA (US); Siri Katrina Maley, Pittsburgh, PA (US); Heather Louise Jones, Pittsburgh, PA (US); Oleg Borisovich Sapunkov, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 16/649,305

(22) PCT Filed: Sep. 21, 2018

(86) PCT No.: PCT/US2018/052245
§ 371 (c)(1),
(2) Date: Mar. 20, 2020

(87) PCT Pub. No.: WO2019/060745
PCT Pub. Date: Mar. 28, 2019

(65) Prior Publication Data
US 2020/0264333 A1    Aug. 20, 2020

Related U.S. Application Data

(60) Provisional application No. 62/606,421, filed on Sep. 22, 2017.

(51) Int. Cl.
*G01T 1/10* (2006.01)
*G01V 5/00* (2006.01)
*G01T 1/202* (2006.01)

(52) U.S. Cl.
CPC ............ *G01V 5/0091* (2013.01); *G01T 1/202* (2013.01)

(58) Field of Classification Search
CPC ......... G01V 5/0091; G01T 1/202; G01T 7/00; G01T 1/00
See application file for complete search history.

(56) References Cited

U.S. PATENT DOCUMENTS 5,286,973 A * 2/1994 Westrom ................... G01T 7/00
250/253
5,686,674 A    11/1997 Lowry et al.
(Continued)

FOREIGN PATENT DOCUMENTS

EP    1548464 A1    6/2005
JP    2001247033 A * 9/2001

OTHER PUBLICATIONS

International Search Report and Written Opinion for International application No. PCT/US2018/052245, dated Jun. 3, 2019, 9 pages.

*Primary Examiner* — Kiho Kim
(74) *Attorney, Agent, or Firm* — Kacvinsky Daisak Bluni PLLC

(57) ABSTRACT

Disclosed herein are a method, apparatus, and software for passive, non-destructive assay of holdup deposits in nuclear piping by in-pipe apparatus. A detector deployed within a pipe is collimated to observe radiation impinging radially inward from decay of deposits that lie on the pipe wall. A radiation detector is centered in the pipe and collimated by a pair of coaxial shielding discs disposed equidistant from the detector. This arrangement causes radiation from a truncated cylinder of pipe deposit within a field of regard to impinge on the detector, while precluding radiation emanating from pipe walls beyond the field of regard from reaching the detector. Hence, observations are unique to a known cylindrical length of pipe. The detector assembly is trans- (Continued)

lated through pipes by an autonomous mobile robotic apparatus. Computer software controls the robotic apparatus, logs data, and post-processes to assay deposits.

18 Claims, 11 Drawing Sheets

(56) References Cited

U.S. PATENT DOCUMENTS

| | | | |
|---|---|---|---|
| 6,806,475 B1 | 10/2004 | Lightfoot et al. | |
| 2006/0284094 A1 | 12/2006 | Inbar | |
| 2006/0290779 A1 | 12/2006 | Reverte et al. | |
| 2012/0012749 A1* | 1/2012 | Girones | G01T 7/00 |
| | | | 250/336.1 |
| 2016/0018532 A1 | 1/2016 | Scott et al. | |

* cited by examiner

A

B

A

B

A

B

SYSTEM AND METHOD FOR PASSIVE ASSAY OF HOLDUP DEPOSITS IN NUCLEAR PIPING

RELATED APPLICATIONS

This application is a national phase filing under 35 U.S.C. § 371 claiming the benefit of and priority to International Patent Application No. PCT/US2018/052245, filed on Sep. 21, 2018, which claims the benefit of U.S. Provisional Patent Application No. 62/606,421, filed Sep. 22, 2017. The entire contents of these applications are incorporated herein by reference.

GOVERNMENT INTEREST

This invention was made with government support under contract DEEM0004478 and DEEM0004383 awarded by the Department of Energy. The U. S. Government has certain rights in the invention.

FIELD OF THE INVENTION

This invention relates to a method for the nondestructive assay of holdup deposits in nuclear piping, and more particularly, to such a method and apparatus for autonomously measuring U-235 content in defunct enrichment facility gas diffusion piping.

BACKGROUND OF THE INVENTION

Efficiently determining holdup quantities of decaying isotopes in nuclear piping is relevant for assuring criticality safety for decommissioning enrichment facilities. Existing methods of non-destructive assay of holdup deposits on nuclear pipe walls involve manual deployment of collimated and shielded detectors, external to the inspected pipes. The standard Generalized Geometry Holdup (GGH) assay technique, as implemented in the Holdup Measurement System software, allows for isotope mass estimation under varying geometric conditions, including a point source, a line source, or an area source. These methods are labor-intensive, subject to gamma attenuation by the walls of inspected pipes and challenging to automate. Pipe wall signal attenuation, coupled with short count times, results in high uncertainty in individual measurements.

No satisfactory system has evolved for assaying holdup deposits by deploying detection apparatus internal to nuclear pipes. Operational and decommissioned nuclear piping generally remains sealed until the facility is dismantled, and, as such, commonly used methods rely on external assays of holdup deposits. Internal access to nuclear piping can be provided when pipes are cut for disposal, or by means of an access manifold.

In Situ Object Counting System (ISOCS) and Holdup Measurement System 4 (HMS4) are examples of existing manually deployed radiometric assay techniques. However, such methods have many disadvantages, including manual deployment, attenuation by pipe walls, long counting time, approximate modeling, and shortfalls associated with transcription and human interpretation. These downsides limit the quality, speed, pragmatics and economy of their application, resulting in an immense cost and schedule consequence to D&D.

There are compelling motivations for robotic characterization of enriched uranium holdup in piping. An in-pipe methodology has the overwhelming advantages of precluding through-wall attenuation, experiencing high count rates for accuracy and certainty, and transiting full pipe length from a single point of launch and recovery.

Segments of piping in gaseous diffusion enrichment facilities have to be removed and cleaned at great expense when their wall deposits contain large amounts of residual $UF_6$ decomposition products (e.g. $UO_2F_2$, $UF_5$, $UF_4$). Other segments deemed clean enough by assay can be left in place to be economically demolished and landfilled with the facility. Current manually-deployed non-destructive assay (NDA) techniques are used to view segments of pipe externally through pipe walls.

Thus, there is need for a simple, nondestructive assay system to provide accurate indication of decaying isotopic material in deposits on nuclear pipe walls by observing with an in-pipe apparatus, versus externally by manual deployment. Such an assay is needed to supplant the time-consuming, costly operations characteristic of manually-deployed methods that observe holdup deposits from pipe exteriors. The need is to develop, certify and robotically integrate a radiometric assay method that exploits the advantages of in-pipe deployment.

SUMMARY OF THE INVENTION

Disclosed herein are a robotic device and an assay method which may be used to perform a high-cadence, robotically deployed NDA technique that surveys process piping internally with detector and sensors that directly view the holdup deposits. The robot uses disc collimation that exposes the detector to radiation emanating only from a cylindrical segment of pipe wall and excludes radiation emanating upstream and downstream from that segment of pipe wall. This is achieved by an innovative pair of collimating discs that are coaxial with the pipe and positioned symmetrically fore and aft of the detector. The detector collimated in this way views an incremental circular belt of deposit at known radius from which simple, accurate U-235 assay is quantified.

An autonomous, untethered robotic crawler carries the disc-collimated detector assembly through pipes and acquires requisite radiometric, visual and geometric data required to determine location within the pipe. The robotic crawler maintains velocity and centering as required by the method. Odometry correlates radiation readings with location along the pipe. The robot is equipped with a spinning triangulation range sensor which rotates to create a model of deposit thickness that is used to inform reporting gamma measurements for self-attenuation of deposits.

Also provided is a method for NDA of holdup deposits in gaseous diffusion piping by integrating disc-collimated gamma detection and untethered autonomous robot operation.

The use of robotic disc-collimated measurement, providing internal measurement provides substantial savings of cost, time, and personnel exposure during D&D of gaseous diffusion enrichment facilities.

While U-235 and Pu-239 are the most common isotopes of interest, the novel system and method disclosed herein is amenable to all others in varying degree. The invention is particularly effective for U-235 determination. At U-235's low 186 keV energy peak, scintillation spectrometers exhibit high efficiency, enabling a high count rate for fast operation. Additionally, thin and hence lightweight, collimators attenuate low-energy 186 keV gamma rays with high efficiency, enabling small collimator thickness and lightweight implementation of the invented apparatus.

In general, it is an object of the present invention to provide a method for nondestructive quantitative assay of holdup deposits on walls of piping in nuclear facilities.

Another object of the invention is to provide a method and apparatus of the above character which operates with direct internal observation of interior deposits, versus external observations through pipe walls to interior deposits.

Another object of the invention is to provide a method and apparatus of the above character capable of determining isotopic quantities with high certainty, at significant operating speed.

Another object of the invention is to provide a method and apparatus of the above character which has a large standoff and generous radial gap between the apparatus and pipe wall to enable unimpeded translational progress through pipes.

Another object of the invention is to provide a method and apparatus of the above character that is scalable to the range of pipe diameters that are relevant in nuclear facilities.

Another object of the invention is to provide a method that is relatively insensitive to centering errors within a pipe.

Another object of the invention is to provide a method and apparatus of the above character which is particularly suitable for distinguishing and providing quantitative assay of the absolute amount of U-235 in defunct gaseous diffusion piping.

Another object of the invention is to provide a robotic apparatus that autonomously traverses and safeguards its motion in pipes of various in-pipe obstacles and fittings.

Another object of the invention is to provide safe and rapid deployment, operation, and maintenance of the robotic crawler in many pipes with minimal alteration to existing facility structure without requiring personnel at elevation during deployment.

Another object of the invention is to provide automatic real-time quality control reporting to robot operators before and after each pipe measurement.

Another object of the invention is to provide automatic, wireless, real-time display of health information as well as visual, geometric, and spectroscopic data taken by the robot during traversal of each pipe.

Another object of the invention is to provide automated analysis of the isotope amount, measurement uncertainty, and model applicability within each pipe segment.

Another objection of the invention is to provide automatic generation of inspection reports for review, adjustment, approval, and archiving.

Another object of the invention is to provide automatic integration of calibration and calibration verification operations into the system collection, analysis, and reporting workflow. In general, the present invention results from direct, unattenuated observation of radiation emanating only from a fixed-length annulus of pipe deposit as measured by a collimated detector located at the centerline of the pipe. Analysis of the spectrometry from the collimated detector determines quantitative assay of the isotopic species present within the observed length of deposit.

One embodiment of the invention incorporates a pair of collimation discs equidistant from the detector and coaxial with the centerline of the detector and pipe. The discs bound the view of the detector to a truncated cylinder of deposit on the pipe wall and attenuate radiation emanating beyond that field of regard. Hence the field of regard is a substantial, relevant surface of deposit enabling statistically significant counting that is achievable with short static dwell or by continuous translational velocity of the apparatus through a pipe.

Another object of the invention is the automated self-mobile deployment of the apparatus to center, achieving a driving speed prescribed by the method, and computing location along a length of pipe without human attention.

Another object of the invention is to deduce grams of an isotope in a length of pipe (e.g., grams U-235 per foot of pipe) by automated computation of data acquired by the apparatus.

These and other objects and features of the present invention will become apparent from the following description and claims when taken in conjunction with the accompanying figures.

BRIEF DESCRIPTION OF THE FIGURES

FIG. 2A is front view and FIG. 2B is a rear view. The clearance between the apparatus and the pipe facilitates transport through pipes. The geometric centering of the detector assembly within the pipe profile is evident. Arrangement of visible light sources is displayed in the front view.

DETAILED DESCRIPTION

As used herein, the terms "robot", "robotic apparatus" and "automated robotic platform" are used interchangeably.

Robotic Apparatus

Figure 1:
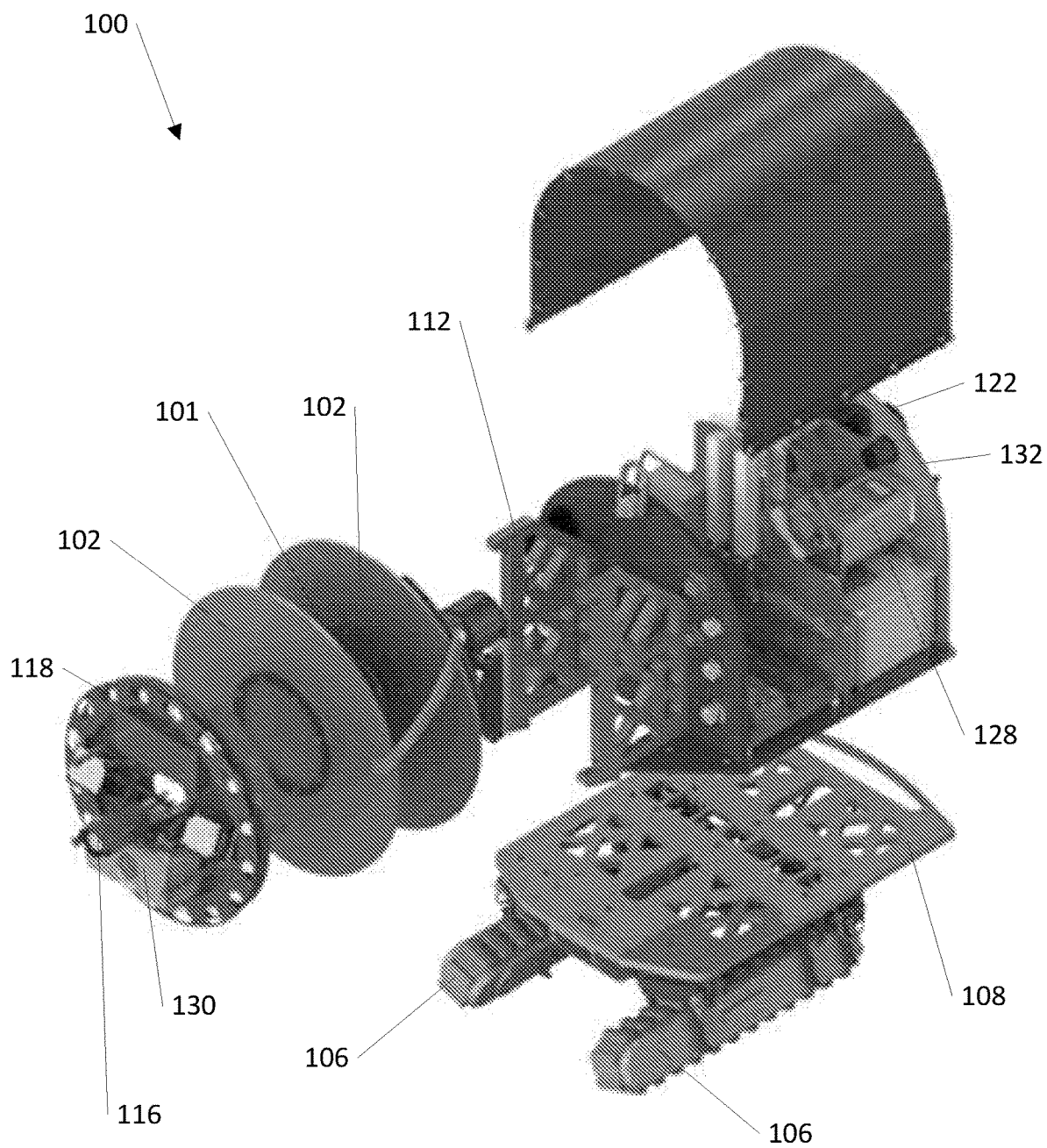
FIG. 1 is an exploded view of a robotic apparatus in accordance with embodiments of the invention, for carrying the detector through the pipe.
Figure 2:
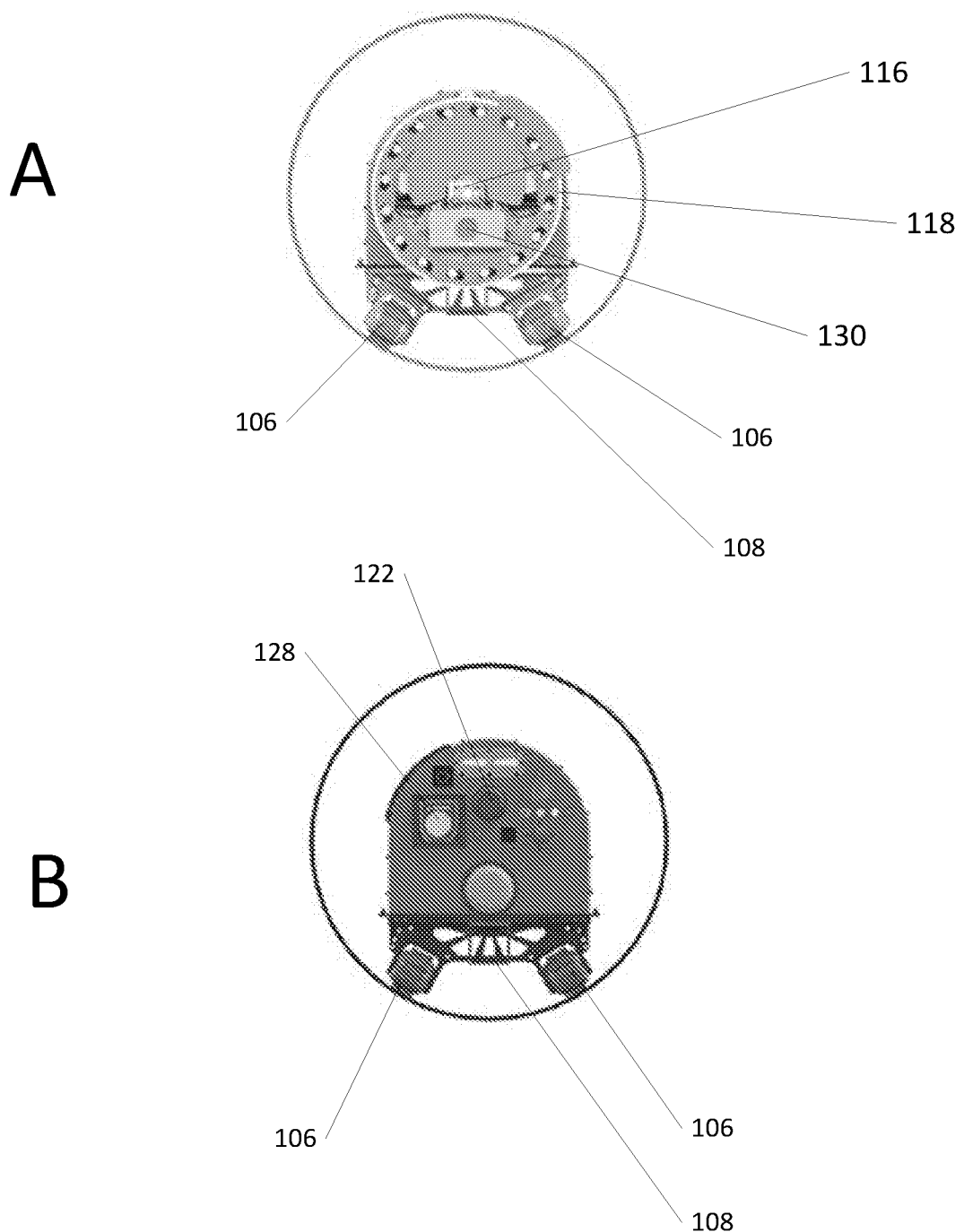
FIG. 2 is a schematic showing the robotic apparatus of FIG. 1 centered within the profile of a pipe.
Figure 3:
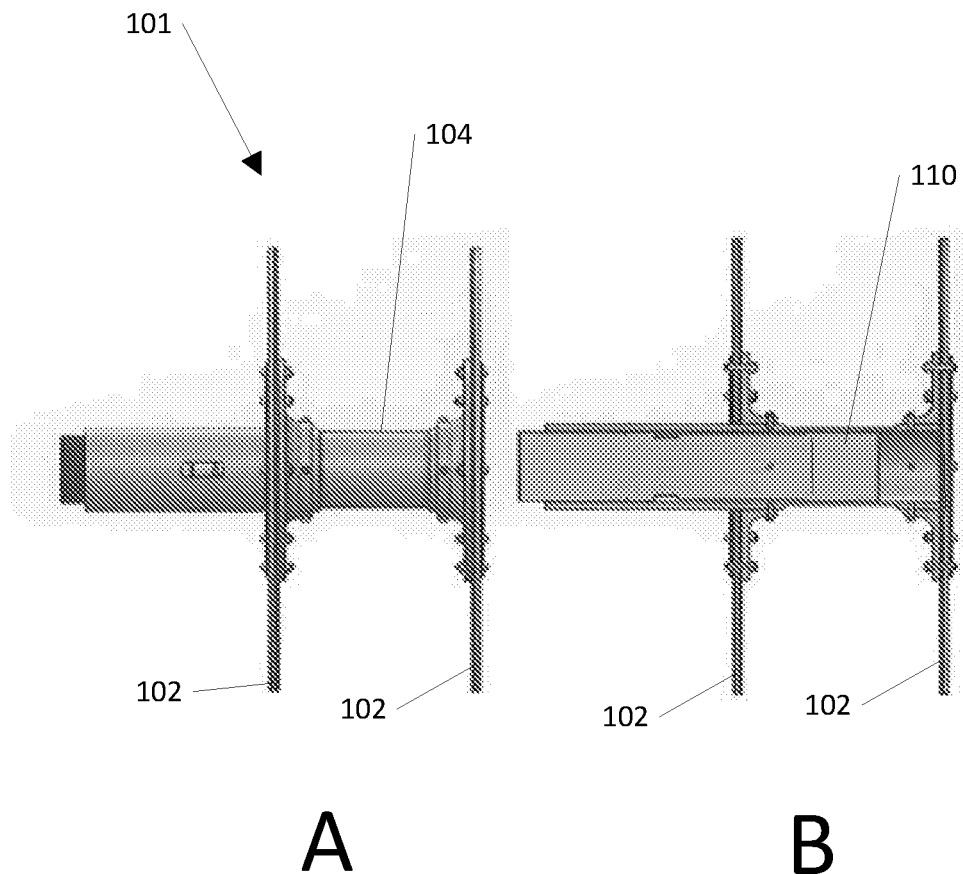
FIG. 3A is a schematic view of disk-collimated detector apparatus constructed according to the present invention and suitable for carrying out the methods disclosed herein.
FIG. 3B shows a sectional view of the detector of FIG. 3A.

With reference to FIGS. 1-3, one aspect of preferred embodiments of the invention is a mobile robotic apparatus 100 supporting a disk-collimated detector assembly 101. In one embodiment, the full-sized robot 100 is sized to handle pipes having a diameter of about 30" to 42" and is approximately 1.2 meters long by 0.5 meters wide and 0.5 meters tall and weighs approximately 120 kg (260 lb.). The size of the robot can be scaled to handle larger or smaller pipes. In certain embodiments, pipes as small as about 3" in diameter may be accommodated.

Robotic apparatus 100 moves through pipes on a platform 108 propelled by track modules 106 that maintain the axial centering of its disc-collimated detector 101 within the pipe. Track modules 106 incorporate encoders for providing odometry and respond to onboard computer commands based on an inertial measurement unit (IMU) to provide information to keep robot 100 upright, centered, and safeguarded. In one embodiment, track modules 106 are canted, as shown in FIG. 2, such as to be radially oriented to the pipe wall. This cant angle can be manually adjusted on a given robot platform to accommodate different pipe diameters. Robot 100 steers the detector 101 to the centerline of the pipe.

The robot 100 also supports auxiliary sensors. In a preferred embodiment, up to seven auxiliary sensors are used. A rear-pointing laser rangefinder 128 is used for sensing absolute distance into the pipe. A planar laser profiler 122 is used for screening of threshold deposit thickness and registering the pipe entrance. Two rotary track encoders disposed in track modules 106 are used for measuring for incremental distance into the pipe. Centered on the front of the collimator module camera 116 and array of light-emitting diodes (LEDs) 118 for imaging of inspected pipes. In certain embodiments, camera 116 may be equipped with a fisheye lens. A forward three-dimensional infrared time-of-flight mapping sensor 130 is used to map pipe geometry in front of the robot. This sensor combines with failsafe point sensors to ensure that the robot stops before encountering any untraversable obstacles. An inertial measurement unit (IMU) is used to actively steer to the center of the pipe and to ensure that the robot stops before pitching above or below its pitch bounds.

A rotating planer laser range-scanner 122, mounted on the rear of robot 100, profiles the geometry of the deposits, providing useful data for self-attenuation calculations and/or correlation to volumetric methods. It also may be used to register the robot position to the start of a pipe. Laser profiler 122 creates a geometric map of each pipe, beginning from outside on the robot launch rig. This sensor may be comprised of a single-point triangulation sensor that is spun in plane while robot 100 crawls through the pipe. In one embodiment, it is sampled at approximately 7 hertz, resulting in a helix of distance ranges, which is modelled as a series of cross-sectional slices. Once localized along the pipe axis, these ranges form a point cloud model of the pipe.

The primary localization sensor of robot 100 is a single-point laser rangefinder 128 that continuously records the distance between a target, comprising, in one embodiment, a vertical plate mounted on the robot launch rig, and the rear face of robot 100 as it traverses the pipe. The rangefinder distance measurements are adjusted by the offset of the launch rig to the cut entrance of the pipe, as registered by laser profiler 122.

Pedestal 112, mounted to support structure 108, establishes the height of the detector assembly 101, such that the radiation detector is centered for a given pipe diameter. The same robot 100 and detector assembly 101 can be adapted for different pipe radii by adjusting the height of pedestal 112. In one embodiment, robot 100 can be manually transformed for use in pipes of different diameters by unbolting and re-bolting detectors 101 of various sizes to pedestal 112. The angles of the track modules 106 are also pivoted to stay tangent with the different pipe size.

Visual camera 116 is disposed on the front of robot 101 for providing visualization and mapping of the pipe interior. The front of robot 101 also houses a camera LED array 118 for imaging which is driven by a custom buck converter board, which enables control of light intensity and pulsing synchronous with camera frame acquisition via the acquisition board. LEDs are mounted using adhesive thermal pads to an aluminum heatsink. Pulsed operation reduces heat load and prevents thermal damage to the LEDs. In alternate embodiments, ultraviolet (UV) or other frequency LEDs could be used for detection of deposit fluorescence or other responses.

Robot 101 may be provided with a user interface 132 on the rear surface.

Additionally, or in lieu of, robot 101 may be controlled by a remote user interface. Communication between the robot and the remote controller may be by any known means, including, but not limited to wired connections, WiFi, Bluetooth, near field, etc. Additional transmissions such as auditory or light media between the two stations may be used for localization.

Figure 7:
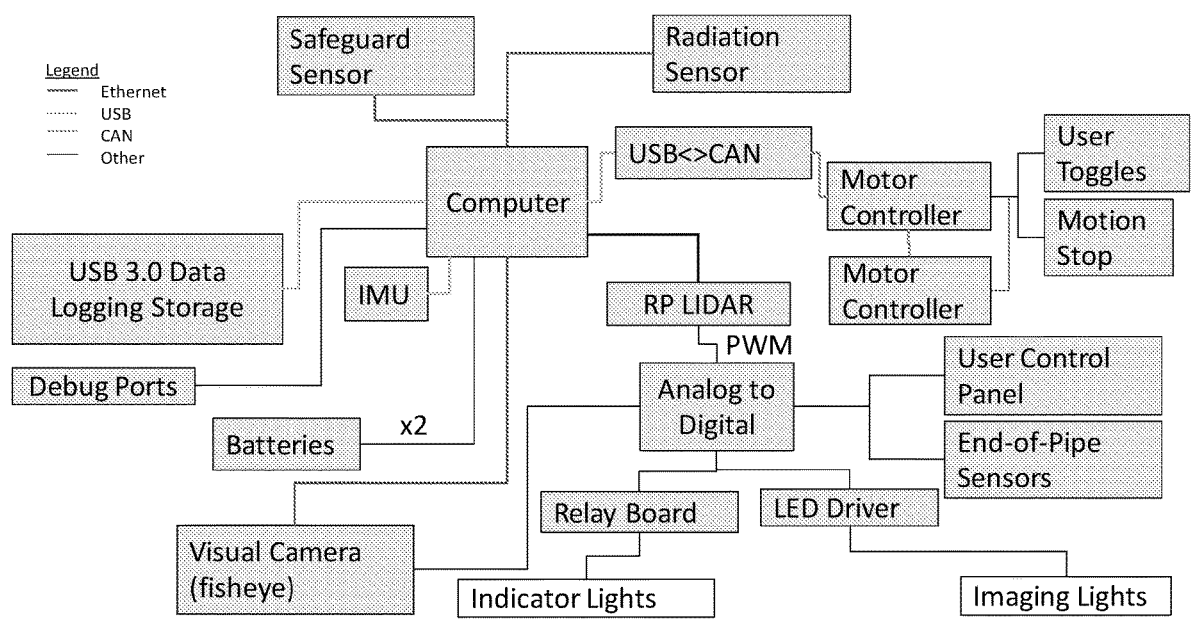
FIG. 7 shows the computing architecture of the robot of FIG. 1.

The two track modules 106 are driven by a pair of digital drives configured for brushed motor operation and networked via Controller Area Network bus (CANbus). A CANbus to USB serial converter provides a network gateway for the main computer. Track encoder feedback is converted from single-ended to differential and provided to the motor drives to close the control loop. Track position is returned from the motor drives to the main computer through the CANbus gateway. A data acquisition board enables digital sensor and operator interface switch input and digital output from the main computer. This computing architecture is shown in FIG. 7.

In one embodiment, the robot computer serves as the central hub for the plurality of inputs and outputs, directly monitoring, logging data, and/or computing results from the forward mapper, radiometric detector, inertial measurement unit, visual camera, geometric profiler, and robot batteries. The computer also communicates via CAN with the motor drivers through which the robot tracks are controlled and the override jog and stop controls are routed. The user interface, redundant safeguard sensors, and imaging and indicator LEDs are routed through an analog-to-digital converter to the computer. Data can be logged directly to a removable USB data drive connected to the computer, and the robot can be accessed, controlled, and monitored through debugging ports with a variety of protocols.

Power, control, mobility, autonomy and data logging occur within the body of the robot 101. Robot 100 operates as a tetherless autonomous robot with fully contained onboard power, safeguarding, and data logging. In one embodiment, the robot's main computer is a fanless embedded Intel quad core i7 system. The radiation detector electronics are powered at 48 volts via power-over-Ethernet and communicate with the main computer via Ethernet.

In one embodiment, power during operations is provided by a pair of onboard 24-volt 20-amp-hour lithium iron magnesium phosphate battery modules with integrated battery management connected in parallel. These provide sufficient energy for all expected robot missions and conditions, with a maximum total round trip of 600 feet or five hours duration. Operators charge the robot via a port on the rear user interface using an off-board charging system that runs on standard 120-volt single-phase power. Charging time is typically two hours allowing for rapid turnaround of robot service.

Power to the various internal buses of robot 100 (48, 24, 12, and 5 volts) are generated via commercial DC/DC converters. Motor drives are powered directly from the main battery bus as is a shunt regulator that prevents excessive bus voltage during motor backdriving. Batteries and inputs to the converters, drives and shunt are protected with ordinary automotive thermal fuses.

Robot Control

The robot control software may be based on the Robot Operating System (ROS) framework. ROS provides message passing tools, data logging tools, debugging tools, and a community of developers that have released open source software packages. The core component in the software system is the system executive. The system executive monitors the operator inputs and processes commands. In one embodiment, pipe information is loaded onto a portable tablet interface and transmitted to the robot when the 'start' button on the tablet is pressed. In another embodiment a physical calibrate switch triggers a predefined series of steps to log data from the radiation detector for three minutes without moving. A start switch on the tablet or the robot user interface 132 triggers the robot to drive forward and collect data. The forward drive continues until either a system fault is detected or a terminating condition is met. The current executive has three predefined terminating conditions:
1. The robot has traveled more than a specified distance.
2. Forward mission duration more than a specified length of time.
3. The robot had a pitch of magnitude greater than a pitch limit.
4. An obstruction was detected using the forward-looking laser mapper or secondary proximity sensors.

Upon detecting a fault or terminating condition, the robot 100 pauses to collect radiometric and geometric data of the turnaround point. It then reverses until its rear-pointing laser rangefinder measures a predefined distance from the target on its launch rig. At this point the robot stops driving and executes a post-run quality control check, after which a change in a status light on user interface 132 indicates run completion. An alternative embodiment stops the robot as soon as the rear spinning triangulation sensor has exited the pipe, before the robot's load-bearing track modules 106 exit the pipe for safety or other purposes.

The multi-channel analyzer for the radiation detector operates in continuous collection mode and the robot computer polls for the current accumulation of counts approximately every 0.1 seconds. These and other sensors' data are recorded to a ROS log file.

The described autonomous robotic platform 100 traverses the pipe to deploy and recover a disc-collimated gamma detector 101 that collects data with minimal human intervention. The system automatically processes the collected data to generate NDA reports and provide input for nuclear criticality safety (NCS) reports via an NCS measurement table.

Detector Assembly

Shown in detail in FIG. 3, The detector assembly 101 is comprised of collimation disks 102 supported within a cylindrical structural support 104 and the detector 110, held within structural support 104. The collimation disks 102, which inhibit radiation from beyond the field of regard by attenuation of the gamma influx, exhibit diameter and separation such that decay radiation from a determined length of pipe impinges on the detector 110, while radiation emanating from the upstream and downstream portions of the pipe is shielded from reaching the detector. The mass of the source from the field of regard on the pipe wall is determined by analyzing the measured spectrum. The robot centers the detector assembly within the pipe for axisymmetric detection of radiation.

The disc-collimated detector assembly is constructed of aluminum-plated lead discs 102 disposed parallel to each other. In one embodiment, the full-sized robot 100 will use lead discs approximately ⅛-inch thick by 18 inches in diameter. The detector's scintillation crystal 100, shown in FIG. 3B, is positioned between the discs 102 using experimental geometric characterization to ensure symmetry. The entire disc-collimated detector assembly is then mounted on pedestal 112 and cantilevered from the front of the robot chassis as a single modular unit. This design ensures no robot components impinge on the full field of regard and excess detection region of the detector assembly.

In certain embodiments, the gamma ray detector 100 may be a thallium-doped sodium Iodide scintillation crystal with a photomultiplier tube and high voltage base. Longitudinally, the detector's photomultiplier and base cause an asymmetry in its detection sensitivity. To minimize the undercount effect of this asymmetry, the profile is kept asymmetric (i.e., the crystal is kept centered). The gamma detector 110 is positioned at a known location within the collimator tube using a polyoxymethylene homopolymer spacer between the detector face and inside of the front lead collimating disc. This spacer centers the detector crystal between the discs.

Figure 4:
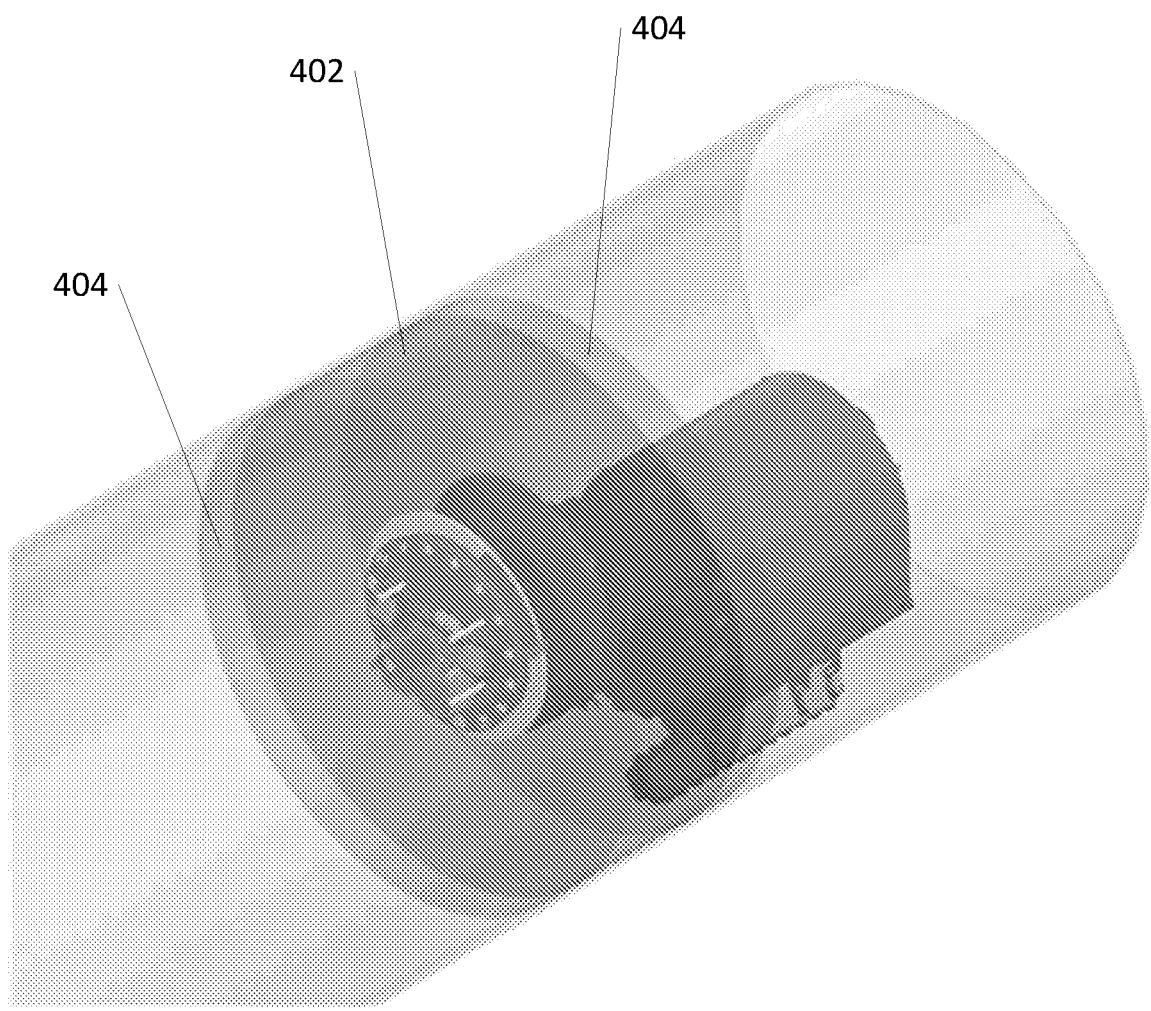
FIG. 4 is a rendering of the robotic apparatus in situ in a gaseous diffusion pipe, showing the main annulus and tail regions of its gamma detector.

The disc-collimation detector confines its primary field of view of the gamma detector to a cylindrical annulus of pipe wall, as shown in FIG. 4. The detector assembly is transported through the pipe such that the viewed section of pipe wall continuously moves along the pipe axis with known localization. The main annulus 402 and tail regions 404 of the field of view of gamma detector 110 are shown in FIG. 4.

Detector Field-of-View

Figure 5:
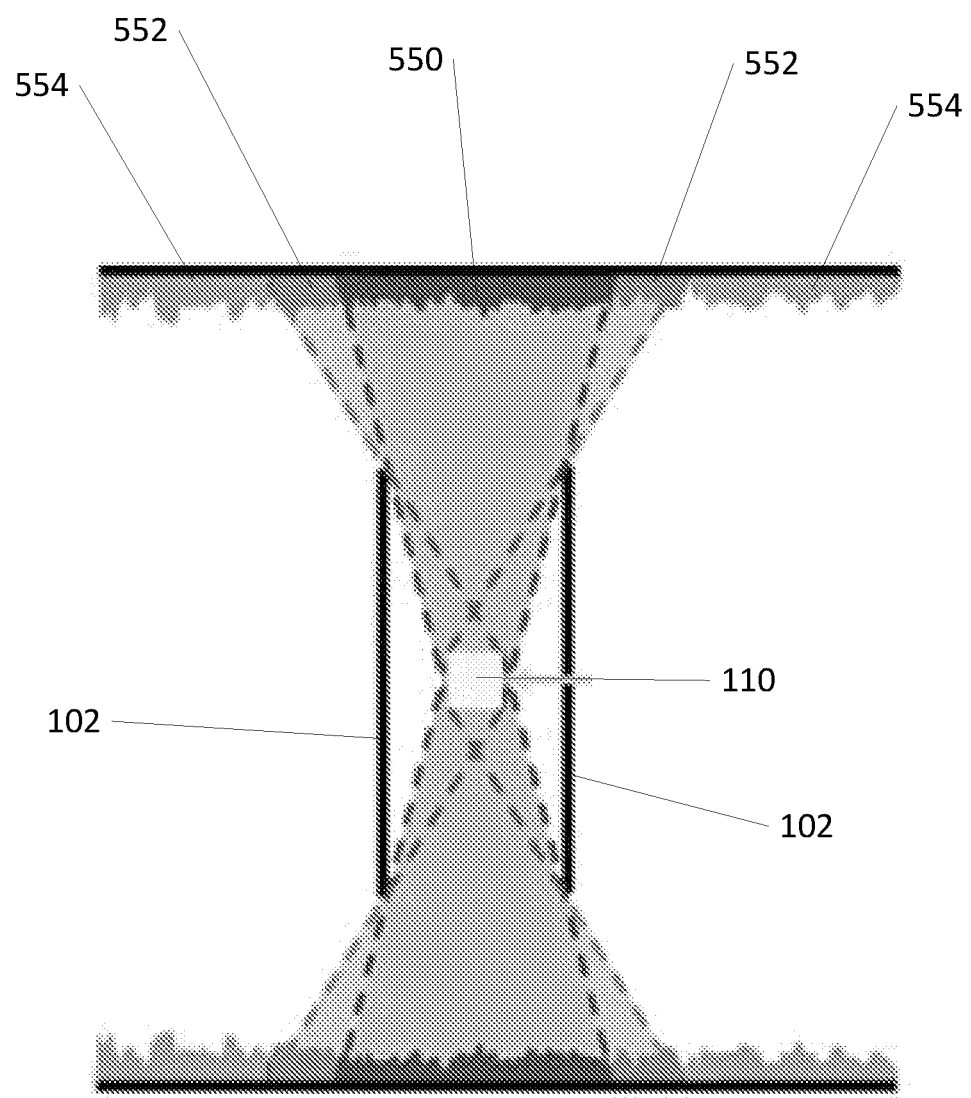
FIG. 5 is a schematic depicting the field-of-view of the disc-collimated detector of the current invention suitable for evaluating isotopes in deposits on a length of nuclear piping. The field of regard, regions of excess detection and regions of no detection are identified.

Disc-collimated detection assembly 101 excludes radiation emanating upstream and downstream from a cylindrical segment of pipe wall to be measured while exposing a detector only to the radiation emanating from that segment. This is achieved by an innovative pair of collimating discs 102 that are coaxial with the pipe and positioned symmetrically fore and aft of the detector, as explained above. FIG. 5 schematically shows the field of view of the detector. Region 550 is the field of regard that connotes the belt of deposit impinging on the entire crystal 110. Region 552 is in excess detection region that connotes narrow rings of deposit partially blocked by collimating rings 102 and impinging only partially on the crystal 110. Region 554 connotes deposit in the remainder of the pipe that is excluded from the crystal 110 by the collimating discs 102. The detector collimated in this way views a circular belt of deposit at known radius and large area, as shown in FIG. 4.

Figure 6:
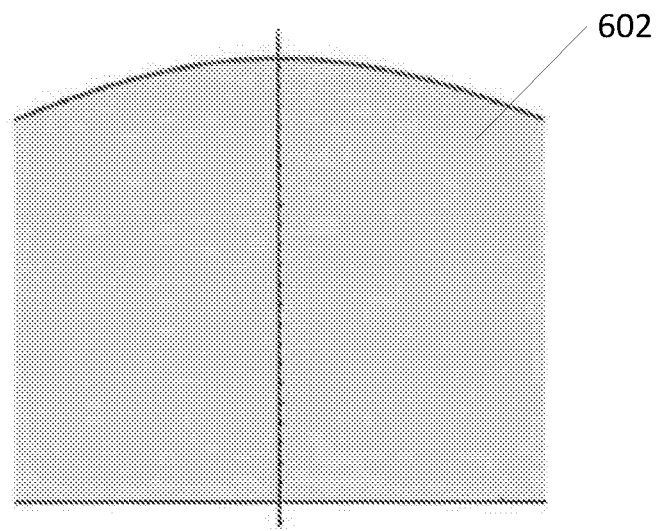
FIG. 6A is an idealized plot of the relative intensity of gamma radiation that emanates from the field of regard, with no excess detection beyond the region of interest, as in the case of collimation disk diameter equal to pipe diameter, or the case of a point-like detector crystal.
FIG. 6B is a plot of the relative intensity of gamma radiation that emanates from locations along and beyond the field of regard, from the perspective of the detector. Regions of excess detection, as seen in FIG. 5, are subject to partial collimation by disks of diameter smaller than the pipe.
Figure 6:
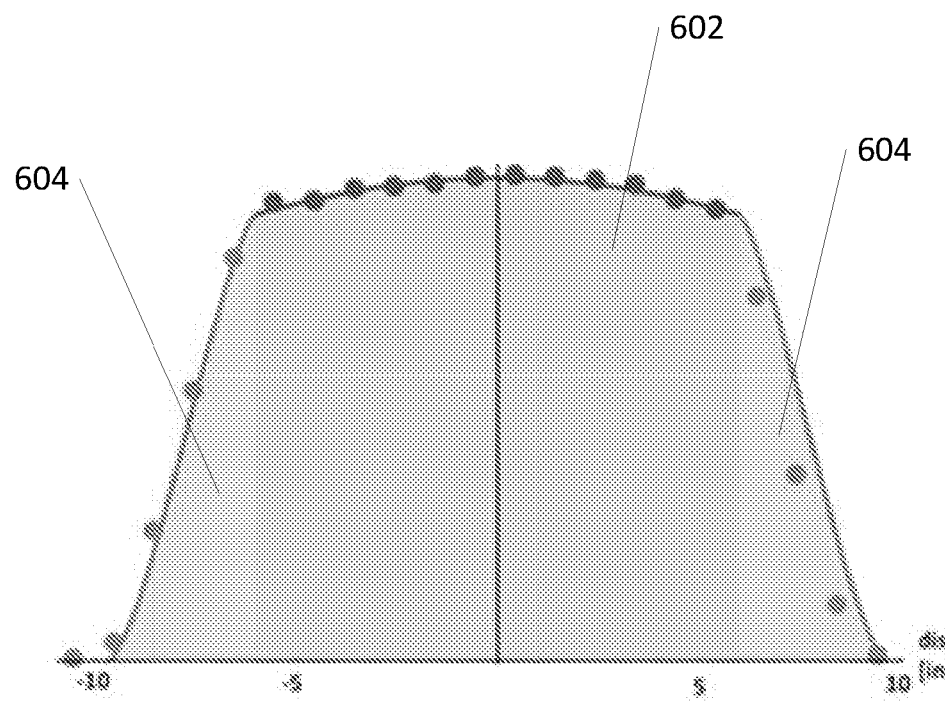

FIG. 6 illustrates the favorable geometric implications of disc collimation as it pertains to correlating detector count with amount of source in a cylindrical belt of deposit around the inside of the pipe. FIG. 6A is an idealized plot of the relative intensity of gamma radiation that emanates from the field of regard, with no excess detection beyond the region of interest, as in the case of collimation disk diameter equal to pipe diameter, or the case of a point-like detector crystal. FIG. 6B is a plot of the relative intensity of gamma radiation that emanates from locations along and beyond the field of regard, from the perspective of the detector. Regions of excess detection, as seen in FIG. 5, are subject to partial collimation by disks of diameter smaller than the pipe.

Region 602 is the region of deposit that impinges on the entire crystal 110 from the field of regard 550 and region 604 is the region of deposit that impinges only partially on the crystal from excess detection region 552. Beyond region 552 nothing impinges on the crystal 110 except an amount less than 1% in the preferred embodiment that leaks through the collimation disks 102. The illustrated graphic depicts an 18-inch (0.46-m) collimator in a 42-inch (1.1-m) pipe. The arc of the central region 602 is primarily due to inverse-square relationship of source nearby the crystal 110 and falloff with axial distance from the crystal 110. The slope of region 604 is primarily related to falloff due to shadowing from full visibility down to no visibility of deposit onto the crystal 110.

The robustness of the method is unaffected by the inclusion of the sloped regions 604 beyond full crystal visibility. Regions 604 are included for practical inspection purposes, since preclusion of regions 604 would require either discs of full pipe diameter or a point detector crystal of dimension zero. Neither is realistic. Pipe-diameter discs would preclude mobility. Point detectors do not exist and could never achieve the high count rate which enables high-speed assay. Practical measurement is instead enabled by smaller discs separated such as to count the complete source within the 1-foot (0.3-m) annulus or smaller and admit only a small overage of source beyond this length. The field of regard 550 that views the complete source is made symmetrical about the midplane of the detector crystal 110. The region of overcount is thus asymmetrical due to inherent asymmetries in scintillation crystal-photomultiplier tube detectors. This asymmetry is irrelevant as the total overage is calculable and correctable by the method or can be retained as a conservatism factor.

The radiometric method also includes a check source integrated into the collimating assembly 101. The check source may be disposed within the spacer which centers the detector crystal between the collimating disks 102. The check source is preferably of a different isotope than the isotope of interest in the measurement and emanates energies that do not interfere with the isotope of interest. It is used as a quality control source to verify detector operation. In one embodiment, the check source is 1 µCurie of Americium-241 and quality control checks include full width at half maximum limits, efficiency (counts in peak) limits, and peak location and peak number limits. These attributes are checked during automatic quality control periods the robot initiates before entering and after exiting each pipe and are also checked with different bounds for spectra collected within each pipe, both by segment and for the full length. Robot 100 provides results for the pre- and post-quality control checks in real time to operators. These checks are computed officially in post-processing and reported for each pipe measurement report. In addition, the system automatically logs past quality control checks and other embodiments could implement automatic trend detection.

In one embodiment, a geometry for measuring U-235 holdup in a 30-inch diameter pipe is provided. In this instantiation, collimating disks 102 are 18" in diameter and ⅛" thick, composed of lead and longitudinally separated by 6.2-inch spacing. The detector 110 is a 2×2 inch cylindrical NaI(Tl) scintillation detector, centered between the collimation disks 102 to measure radiation emanating from a length of pipe wall approximately 8.5 inches long. The resultant excess detection region 552 is approximately 1.7 inches in length. The generous field of regard 550 enables a high count rate, unachievable by other methods, which is proportional to the quantity of decaying isotope within the field of regard 550. In turn, the high count rate enables holdup deposit assay under conditions of continuous travel through nuclear piping.

The same collimator generates an 11 in. long main field of view in 42-inch pipe with 3.5-inch long tail regions.

Alternate embodiments vary in geometry, collimating material, detector, region of regard, and mechanical details of assembly. Geometric variations of the collimating disk assembly are dependent on pipe radius, disk diameter, field of regard, and crystal dimension, which determine the required disk spacing and the resultant overcount region. Selected geometric variations are tabulated, in inches, as shown in Table 1.

TABLE 1

| Pipe Radius | Disk Diameter | Field of Regard | Crystal Dimension | Spacing | Excess Region |
|---|---|---|---|---|---|
| 15 | 16 | 12 | 2 | 7.625 | 2.625 |
| 21 | 16 | 12 | 2 | 6.091 | 4.558 |
| 15 | 18 | 12 | 2 | 8.250 | 1.969 |
| 15 | 16 | 10 | 2 | 6.500 | 2.500 |
| 15 | 16 | 12 | 1 | 8.723 | 2.899 |

Use of the 186 keV peak to quantify U-235 has the advantage of a lightweight collimator solution. Thin (⅛-inch or 3.18-mm) lead nearly completely attenuates the 186 keV peak. Hence, discs can be large enough for geometric collimation and light enough for robotic deployment. The detector selected for this method uses a 50-mm long by 50-mm diameter (2-inch×2-inch) Thallium-doped Sodium Iodide (NaI(Tl)) scintillator mated to a 50-mm (2-inch) photomultiplier tube and tube-base multichannel analyzer. The components chosen were a temperature-stabilized detector and a multi-channel analyzer base from Canberra (NAIS-2×2 and Osprey base, respectively). NaI detectors exhibit high efficiency in measuring U-235's 186 keV gamma photons and are site-approved for use at the robot's DOE testing facility.

Disc-Collimated Radiation Detection Method

The preferred embodiment for the method of calculating isotope mass in holdup deposit will now be more fully explained. Accurate estimation of isotope mass depends on geometry of the collimated detector assembly within piping, gamma attenuation efficiency of materials used in collimators and assembly structure, intrinsic counting efficiency of the detector, and self-attenuation of the holdup deposit itself.

The factors involved in computing the grams of U-235 in the detector's field of regard (including the aforementioned geometric considerations and given reported counts from the detector) are summarized in Equation 1, where $M_{isotope}$ (in this example MU235) is the mass in grams of U-235 contained in deposit on a length of pipe centered around the disc-collimated detector. The theoretical values of these factors in 30- and 42-inch (0.76- and 1.1-m) pipes are tabulated in Table 1.

$$\frac{M_{U235}}{L_{ft}} = \frac{counts_{meas,adj}}{time_{meas}} * \left(\frac{1}{act_{U235}}\right) * \left(\frac{1}{cal_{eff} * cal_{trans}}\right) * \frac{1}{atten_{deposit}} * \frac{L_{ft}}{L_{main}} \quad (1)$$

where:

Mass U-235 is normalized per unit length $$\left(\frac{M_{U235}}{L_{ft}}\right),$$

for example, in grams per foot, using the same ratio of content as in $$\left(\frac{M_{U235}}{L_{main}}\right)$$

which is the quantity of interest for NDA and NCS determination;

The net count rate $$\left(\frac{counts_{meas,adj}}{time_{meas}}\right)$$

is in peak (with continuum scattering contribution subtracted), adjusted for the longitudinal source discontinuity effect;

The count rate ($counts_{meas,adj}$) is adjusted for potential deposit discontinuities;

A combined correction factor $$\left(\frac{1}{cal_{eff} * cal_{trans}}\right)$$

for the detector efficiency and transfer function is experimentally calibrated for the operating conditions.

The self-attenuation factor ($atten_{deposit}$) is defined as the ratio of detected (attenuated) to actual grams of U-235.

Specific activity of U-235 at 185.7 keV ($act_{U235}$) shall be taken as a constant provided by the NDA customer. The assumed used in this document is 45,586 gamma rays/second/gram.

The transfer function mathematically represents the convolution from an input source signal to the detector's response along the longitudinal pipe axis. Transfer function calibration ($cal_{trans}$) is done by moving the robot by a point source. The experimental response is then iteratively compared to a theoretical prediction to optimize for the true field of view length. Efficiency calibration ($cal_{eff}$) is done by moving the robot by a discrete-length source with known total uranium-235 content and known self-attenuation properties. This is used to find a multiplier that would convert between the actual quantity of uranium observed and the quantity measured by the robot.

Radiometric method constants for exemplary 30 inch and 42 inch pipe are shown in the following tables. Table 2 shows theoretical view factors from deposit in 30- and 42-inch pipes to the main annulus and tail regions, along with the through-disc views. Table 3 shows example characteristic ratios representing the count rate expected per gram of deposit in the detector's main annulus of regard, using theoretical detector efficiencies and geometry factors.

TABLE 2

| View Factor | In 30-inch Pipe (ø = 29.25 inches) | In 42-inch Pipe (ø = 41 inches) |
|---|---|---|
| $vf_{main}$ | 0.00141 (81% of total) | 0.00072 (74% of total) |
| $vf_{tails}$ (both tails combined) | 0.00026 (15% of total) | 0.00021 (22% of total) |
| $vf_{thrudiscs}$ | 0.00007 (4% of total) | 0.00004 (4% of total) |
| $vf_{total}$ (sum of above) | 0.00174 | 0.00097 |

TABLE 3

| Theoretical Detector Efficiency | Theoretical 30-inch Pipe Ratio (counts/sec)/ (gram in view) | Theoretical 42-inch Pipe Ratio (counts/sec)/ (gram in view) |
|---|---|---|
| 100% | 79.3 | 44.3 |
| 44% | 34.9 | 19.5 |

Figure 8:
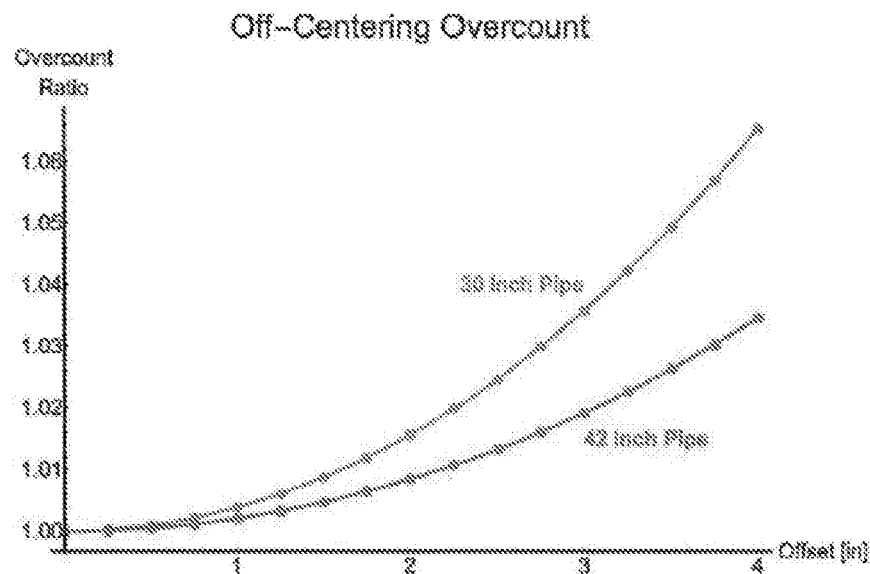
FIG. 8A is a graph demonstrating the insensitivity of the method to centering error in detector assembly position within a pipe.
FIG. 8B is a graph showing effect of skew of the detector within the pipe
Figure 8:
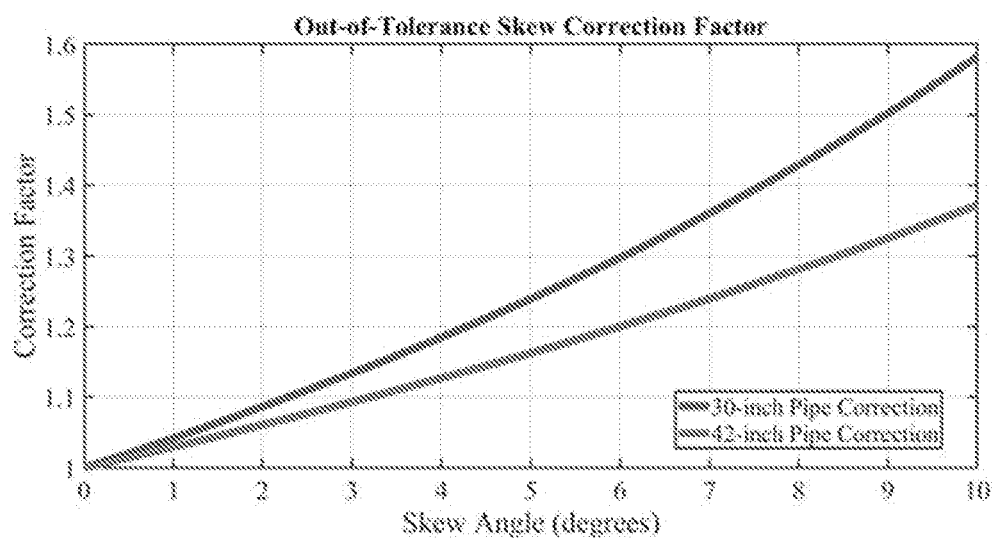

The preferred embodiment of the apparatus and method for calculating isotope mass explained above is insensitive to geometric off-centering of the detector assembly within the pipe, as illustrated in FIG. 8A. Geometric offsets on order of 1" from pipe center, which induce overcounts of less than 1% in large pipes, are detectable by the rotating range scanner and correctable by the automated self-centering of the robot. The centering of the detector is much more critical in smaller diameter pipes. Of greater effect is a skewed rather than radially offset detector, per FIG. 8B for a worst-case deposit distribution exactly opposite the skew angle.

In a preferred embodiment, the software automatically computes estimated mass of decaying isotope by using collected spectrum data and relates computed mass estimates to their location within the pipe. Uncertainty in mass measurement is estimated from the number of counts used for mass calculations as well as other systematic and random uncertainties from data collection and instruction calibration. It may be displayed graphically by dashed and dotted lines on the mass estimate visualization. Users are provided optional energy-spectrum information tagged to pipe location.

After a pipe inspection run, data are transferred to a post-processing computer and processed to determine localized values for grams per unit distance in accordance with the method explained above. While accumulated gamma spectra data are stored every 0.1 second, these data are re-processed to a user-specified collection and reporting time. Incremental spectra for each 0.1 seconds are obtained by subtracting the previous spectrum from the current spectrum. Counts in the selected collection time are obtained by summing [collection time]/0.1 of these incremental spectra. Spectra for various collection periods can be computed. In one embodiment, the collection period is defined by the time spent over a particular pipe segment. There can also be a fixed-time collection period. Results may be reported as frequently as the 0.1 second recording frequency, or they could be reported only once for each measured segment. Each spectrum is considered to be localized at the position where the detector was in the middle of the collection time For a given localized spectrum, a grams per unit length measurement can be computed from the number of counts in the 186 keV peak, in accordance with Equation 1. Counts in peak for a given spectrum are given in Equation 2 below. $counts_{peak}$ is generally taken as the sum of all the counts in a peak region of interest in the spectrum. $counts_{contin}$ represents the estimate of the background or Compton continuum in the peak region of interest. In one embodiment, it is computed as the area of a trapezoid formed by the edges of the peak region of interest. It may also be computed as the sum of the counts in a second region of interest, or by some other method. Explicit subtraction of a background spectrum captured with no sources present may or may not be part of this computation.

$$counts_{meas} = counts_{peak} - counts_{contin} \quad (2)$$

This method uses an efficiency calibration spectrum to compute a linear energy calibration using the uranium-235 186 keV peak and the check source (60 keV americium 241). Peak locations are found through a Gaussian fit of the peaks; the Gaussian mean is used as the peak location. Slope (m) and offset (b) parameters for a linear calibration are then computed from the locations of the two peaks.

One embodiment of this method does not use background subtraction as a means of conservatism because background cannot be estimated along the pipe length. However, the background spectrum collected during quality control checks is used to compute the minimum detectable amount for isotope quantification. Because background spectra are collected outside of a pipe and inspection data are collected inside a pipe, it is important to account for attenuation through the steel pipe walls before doing background subtraction. Since the steel used is primarily iron, a table of attenuation data for iron is interpolated to find an appropriate attenuation multiplier for each spectrum channel, given the specified pipe thickness. This attenuation is applied when the lower limit of detection is computed per Equation 3:

$$LLD_{seg} = \left( 3 + k_{LLD} * time_{seg} * \sqrt{2 * \left( atten_{pipe} * \left( \frac{counts_{QC,peak}}{time_{QC}^2} + \frac{counts_{QC,contin}}{time_{QC}^2} \right) + \frac{counts_{contin}}{time_{seg}^2} \right)} \right) \quad (3)$$

where:

$k_{LLD}$ is based on the confidence interval taken per customer request;

$counts_{meas,contin}$ the sum of counts in the continuum ROI for 185.7 keV taken from the foreground (measurement) spectrum;

$time_{meas}$ is the collection time for the foreground (measurement) spectrum;

$atten_{pipe,peak}$ and $atten_{pipe,contin}$ are the through-pipe attenuation corrections for the QC spectrum. These attenuation corrections are calculated using $$atten = \frac{\mu\rho * thick}{1 - e^{-\mu\rho * thick}};$$

$counts_{QC,peak}$ is the sum of the peak ROI in the QC background spectrum;

$counts_{QC,contin}$ is the sum of the continuum ROI in the QC background spectrum;

$time_{QC}$ is the collection time of the QC background spectrum; and

The Minimum Detectable Amount (MDA) is computed from the LLD in a method parallel to that used for computing mass of deposit from observed counts. Minimum Quantitation Amount (MQA) is derived the same way, except using the LLQ instead of the LLD, where the LLQ is a constant factor larger than the LLD for the preferred embodiment. These calculations are presented in Equations 4 and 5.

$$MDA = LLD * \frac{1}{atten_{deposit}} * \left( adj_{discon} * fact_{30,42}^{-1} * \frac{L_{ft}}{L_{main}} \right) \quad (4)$$

$$MQA = MDA * k_{MQA} \quad (5)$$

where:

$$\left( fact_{30,42}^{-1} * \frac{L_{ft}}{L_{main}} \right)$$

is the total calibrated counts per second per gram-per-foot ratio for the given robot and pipe size;

$atten_{deposit}$ is the attenuation factor calculated using the segment's measured counts (or as the average of the segment $atten_{deposit}$ factors for multi-segment calculations); and $k_{MQA}$ is the multiplier for conversion between LLD and LLQ.

One embodiment of this method includes two calibrations, one for the efficiency vs position function of the disc collimation and one for the total efficiency of the assembly without regard to position. The former uses a point source of any suitable isotope, which the robot automatically moves, pauses, and collects spectra over and incremental locations. These data are used to calibrate the theoretical efficiency vs position function by gross scaling of the counts to equalize the integrals of the theoretical and experimental data and then adjustment of the theoretical field of view length (e.g. disc spacing) to minimize the root mean square error between the theoretical and experimental functions. This adjusted field of view length is used as the calibrated field of view length for the given collimator.

The second calibration involves the robot automatically driving over a known quantity, attenuation, and length of the isotope of interest at a drive speed suitable to achieve low counting uncertainty. The total quantity of isotope measured (regardless of location) is compared to the known attenuated quantity, and this ratio is taken as the overall efficiency.

The method integrates sources (even with sharp discontinuities) within its one-foot field of view. For example, given a source that is 1.5 feet (0.46 m) long and averages 25 g/ft (85 g/m) of U-235. The actual g/ft over a one-foot field of view does not reach 25 until the entire field of view is over the source, or about 6 inches (0.15 m) in. Likewise, the actual g/ft drops below 25 within about 6 inches (0.15 m) of the far side of the source. Also, since the robot is moving, it reports the moving average of the actual g/ft number. This moving average may be done over a specified distance, or it could be done over a fixed time. For a one-foot wide source that would push the g/ft value just slightly above a leave/cut threshold surrounded by bare pipe, the moving average can miss the peak. However, conservatism can be built into other parts of the method, (for example, using an overly conservative assumption on self-attenuation), such that the method always overestimates. Deposits in actual piping are also expected to vary much more smoothly. One embodiment of the method assumes that all sources are exactly the worst-case (1 foot) length and multiplies all sources by ratio of the measured versus actual peak content of a 1 foot source. (Note that the total content is equivalent, but the elongation of the measured source means the measured peak is lower.)

Localization

Data collected from a suite of odometry sensors are fused (i.e., combined) to localize the position of robot 100 with the pipe, and, consequently, the area of the pipe from which the U-235 gram per foot measurements are collected. Sensing features include absolute registration to the cut entrance of each pipe, absolute distance using a single-point laser rangefinder, and incremental distance using encoders integrated in track modules 106.

The position of the robot 100 along the pipe is defined by the position (i.e. datum) of the designed midplane of the collimating discs 102 (equivalent to the center of its full field of regard within tolerance). This is specific to each robot. Localization reports all localized positions relative to this robot datum.

The time history of robot localization along a pipe is computed during post-processing of the data by using factor graph optimization to fuse absolute distance readings from the rear-pointing laser rangefinder 128 with incremental encoder data from track modules 106. Additional landmarks from visual odometry, radiometric data, known pipe geometries, etc. can also be incorporated. Additional post-processing involves error checking of this method by comparing it to the expected trajectory in each pipe.

For long pipe runs, in-pipe artifacts and steering geometry may preclude the laser rangefinder 128 from continuously registering the target on the launch rig at the entrance of the pipe. When this continuous absolute measurement is not available, localization is supplemented by incremental odometry from encoders in track modules 106.

It has been empirically determined that signal intermittency may occur when robot 100 has travelled at distances greater than approximately 50 feet into the pipe in certain pipe sizes. Occasional measurement fixes are recorded throughout traversals to the maximum tested distance of 100 feet, and these intermittent fixes are also used in localization calculations.

Robot 100 traverses the pipe using two sealed track modules 106 with integrated rotary encoders. The encoder count values are logged continuously during the forward and reverse traversal of each pipe. Track modules 106 have analytically derived and experimentally verified count-to-distance transforms. These scale factors are adjusted using a gradient descent optimizer on the laser rangefinder measurements collected concurrently in each run during factor graph optimization. Track modules 106 also have built-in clutching mechanisms, which are characterized for their effect on encoder counts for localization, both in the nominal value and in the certainty weighting in factor graph optimization.

Factor graph optimization is used to fuse localization sensor data into the interpolated position and uncertainty of the gamma detection field of view throughout forward and reverse traversals of pipe by robot 100. Gamma detector spectra, adjusted track encoder counts, laser rangefinder distance measurements, and laser profiler registration of the pipe entrance all have known position transforms with respect to each other, and all data points are time stamped by system software when collected.

The method of fusing these data is factor graph optimization, a graphical method for solving simultaneous localization and mapping (SLAM) problems. Post-processing software (PPS) runs factor graph optimization to probabilistically localize each sensor measurement along a forward and reverse pipe length.

The factor graph optimization method simultaneously returns combined localization uncertainty at each point, which, along with the ground truth testing, inform various measurement requirement localization thresholds. This includes thresholds may include, for example: (1) The uncertainty of the total pipe length; (2) The uncertainty of the midpoint of a given segment along the measured pipe; and (3) the uncertainty of the length of a given segment. This localization uncertainty is minimal and based on the input uncertainty characterization of each sensor as determined by testing under known ground truth conditions.

Note that for both input sensor and factor graph uncertainty, the only notable radiometric effect is the gross shifting of measurement location. While localization values do have some minimal effect on the spectroscopic moving average, this effect is orders of magnitude below that of counting uncertainty.

Figure 9:
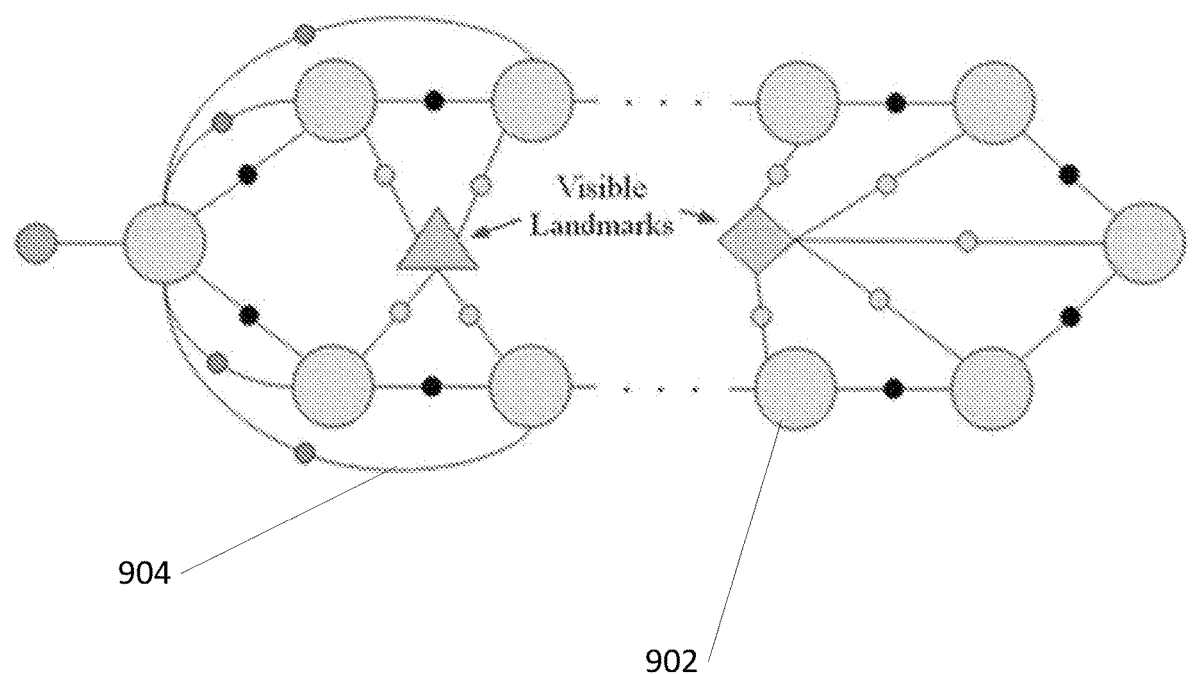
FIG. 9 shows a factor graph illustration of the localization process of the present invention.

A model factor graph illustration is shown in FIG. 9. A series of nodes 902 representing the forward and reverse pose time series of robot 100 are joined by several types of edges 904 that represent sensor measurements between the pose states.

In one embodiment, factor graph edges (i.e., sensor measurements) are primarily absolute distance readings from the laser rangefinder 128. When the robot traverses far enough that these readings become intermittent, the optimization algorithm uses these intermittent fixes to adjust the incremental track encoder readings.

Associating Pipe Locations With Collected Spectra

With the exception of the farthest measurement segment (i.e., where the transition from forward to reverse traversal takes place), robot 100 is continuously moving along its pipe axis throughout each NDA run. Each instantaneous time-stamped sensor reading (from any sensor) is associated with a pipe location based on the position of the robot datum at that timestamp. The time series position of the robot datum along a pipe axis is determined by localization, described above, which reports based on this datum.

Each measurement segment is defined by when the robot datum crosses into and out of that segment. The timestamps associated with this set of localization positions are used to correlate all other radiometric and geometric sensor data to the given segment.

Figure 10:
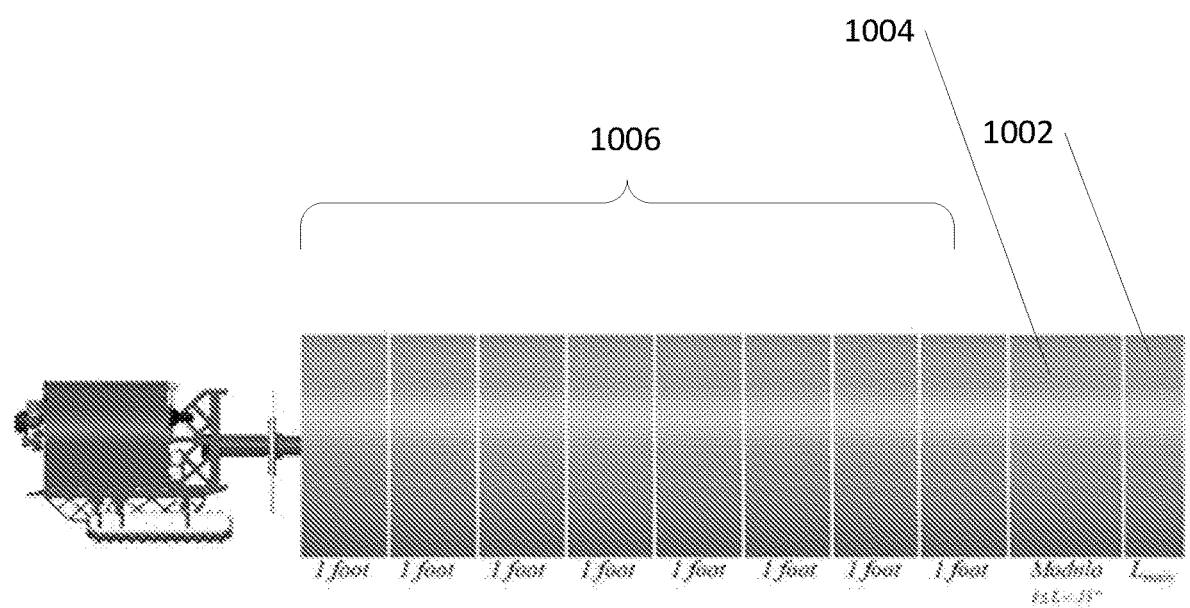
FIG. 10 illustrates the method for the division of a pipe into segments.

In one embodiment, segments are twelve inches long (within localization tolerances) except the one or two segments farthest from the launch edge. These rules of segment division are shown graphically in FIG. 10. In one embodiment, the pipe is broken up into a series of segments 1 ft in length 1006, although any length may be used. The last segment 1002 is the length of the robot's main annulus of regard, as calibrated from the detector transfer function. The preceding segment 1004 is the remaining pipe length modulo 12 inches, if the modulus is greater than or equal to three inches. If the modulus is less than three inches, it is combined into the preceding segment, making the resulting actual second-to-last segment up to 15 inches long (exclusive).

Consecutive ascending numbers are assigned to pipe segments starting from the launch (entrance) edge, meaning that (1) the annulus-length segment is the highest numbered and farthest from the launch edge; and (2) the 3-to-15-inch segment is the second highest and farthest.

The gamma detector logs a continuous accumulation of counts per spectrum channel, which are polled and time-stamped at nominally 10 hertz. These timestamps are used to associate every accumulated spectrum with the localization of the robot datum.

During analysis after each batch, the PPS calculates incremental spectra for time (and thus distance) window by subtracting the start spectrum from the end spectrum of the window. This method enables measurements to be precisely correlated with pipe segments, even when the location of each individual segment is not known a priori.

Total Measurement Uncertainty

Data collected by the robotic crawler in each pipe are also analyzed to determine the total uncertainty on the reported isotope content in each section of piping. Methods have been developed and implemented to determine the uncertainty contributions of: positional and total calibration testing, length of the main annulus of regard, longitudinal variation in isotope content, instantaneous pose of the gamma detector, actual pipe diameter, and self-attenuation effects.

Calibration uncertainty is determined by a quadrature summation of the uncertainty effects from the known-content reference sources and the counting uncertainty of the tests.

The uncertainty of the length of the main annulus of regard, longitudinal variation in isotope content, instantaneous detector pose, and real pipe dimensions all originate from uncertainties about the positional efficiency of the collimated detector and thus carry both that experimental uncertainty and the root-mean-square error of the calibrated model and the experimental result. Alternative embodiments can use the direct uncertainty effects of the calibration on each factor, based on additional real or simulated calibrations.

Additional uncertainty in the real pipe dimensions and detector pose come from knowledge of these physical phenomenon, the first from standards and/or experimental characterization and the second from general characterization or actual instantaneous pose determination.

In one embodiment, the uncertainty due to self-attenuation of deposit is calculated by recomputing the self-attenuation factor with the worst-case isotope enrichment and other properties and the worst-case isotope content based on the other uncertainties referenced hereinabove.

Robot behavior, detected pipe characteristics, or other model assumptions determined to violate these measurement and uncertainty method assumptions are automatically flagged by the data processing software.

These out-of-model flags include above-tolerance or incomputable skew or radial offset in detector pose, out-of-tolerance or incomputable pipe geometry, and infinitely thick deposits.

In one embodiment, additional automated information available to analysts includes the condition that triggered robot reversal, whether this reversal was within tolerance of the expected traversal distance from the measurement request, the self-attenuation and/or other model used, the result of each quality control check, assumed source material information, and other robot and software functional checks.

Quality Control and Replicate Method

The robot is recovered from the same pipe opening from which it is launched, hence it drives the same distance out and back, measuring the same deposits twice. This achieves redundant radiometric and odometric measurements which adds further to statistical significance of the method. These separate measurements are also compared as replicate datasets for data quality purposes.

Nominal operation for pipe inspection includes collection of a background and quality control (check source) spectrum, a pipe inspection run during which data are collected as the robot travels forward and as it reverses back out of the pipe, and a final background and quality control spectrum collection. Comparison of background data before and after a pipe run can verify detector performance and determine if radioactive contamination that would interfere with valid measurement was picked up on the robot during a run.

One embodiment of this replicate method is to compare the highest-loaded (isotope concentration) segment as measured in the forward traversal with the content of same segment on the reverse traversal. A second check is to compare the total isotope content of the pipe length as measured in forward versus reverse and ensure they are statistically equivalent.

Additional quality control checks are and can be included in various embodiments of this method. One such check is verifying the location, full width at half maximum, and counts in each expected isotope peak for a spectrum comprising of all counts collected during traversal of a pipe. Another check is examining the counting statistics of the check source at each reported segment of pipe.

In a preferred embodiment, any and all quality check and measurement results can be provided in real time to operators to determine in-situ detector, robot, or pipe characteristics.

Automated Calibration & Verification Processes

In one embodiment, the method includes test pipes with removable panels for the attachment of known isotope sources. The robot has specific measurement request settings that allow it to log runs in these pipes as calibration verification runs and store these data to ensure calibration has been checked within the required time window. Other embodiments could include automatic integrated comparison of these results with the known isotope configurations.

In one implementation of the invention, this is done separately for independent verification purposes.

Estimation of Self-Attenuation from Within Process Piping (Centered)

Self-attenuation or self-shielding of isotopes relates to the thickness of an isotope source normal to the detector. One embodiment of this method uses the minimum measurable thickness of the robot's geometric sensor as the assumed thickness of this deposit. The post-processing system then automatically adjusts the modeled coverage of isotope at this assumed thickness to achieve the measured count rate of the isotope. If this coverage ratio exceeds 100%, the assumed thickness is increased. If it is below a reasonable ratio (e.g. approaching zero percent), the thickness is decreased. If the geometric sensor measures a larger thickness, the system throws a flag. In addition, the detected count rate is checked against the infinite thickness threshold at which a deposit is so fully attenuated that its actual thickness cannot be determined radiometrically. Other embodiments can directly use the geometrically measured thickness in this method. Note that coverage changes are not required to be limited to radial variation only. The 50% coverage pipe images in FIG. 11A all have the same modeled coverage, count rate, and grams, making them functionally equivalent.

Estimation of Self-Attenuation from Within Process Piping (Off-Centered)

Figure 11:
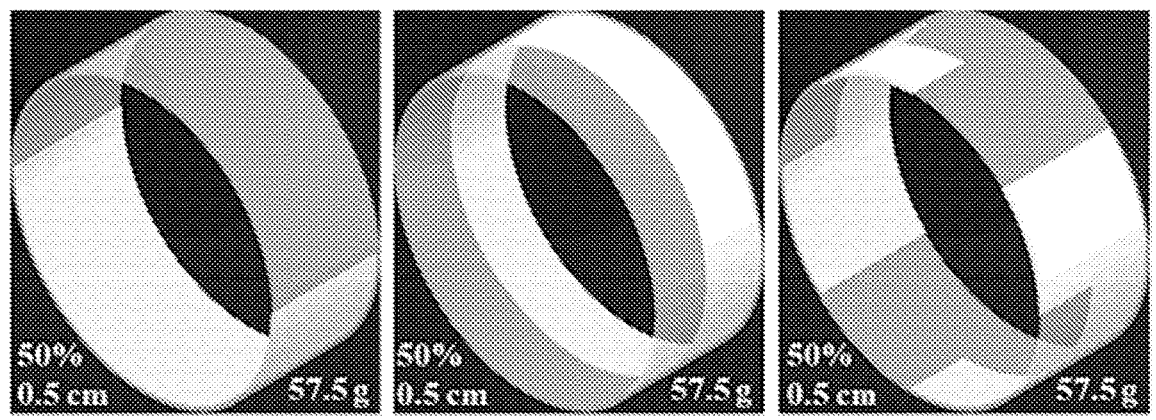
FIG. 11A shows three equivalent 50% threshold deposit pipes with different coverage geometries.
FIG. 11B shows highly conservative tapered annulus model of threshold deposit geometry. The left figure shows the 100% coverage threshold deposit pipe and the right figure shows a lower coverage model used to match the count rate in a particular assayed pipe segment.
Figure 11:
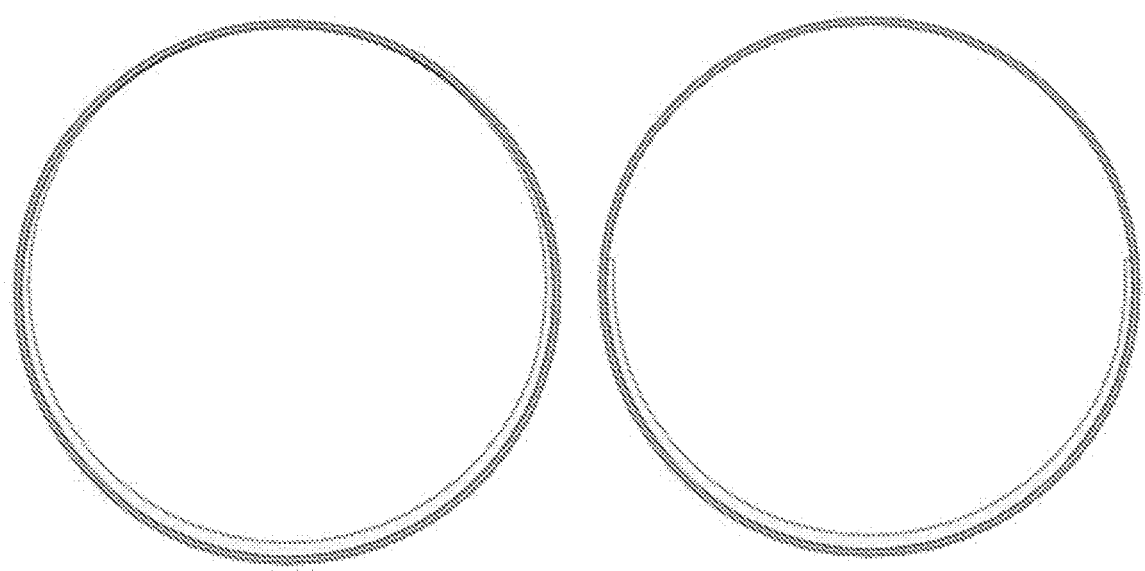

A derivative of this method is to assume the isotope coverage is off-centered in the pipe, as shown in FIG. 11B. In this embodiment, comparisons to pipe wall geometry are made on the basis of diameter rather than radius. In this case adjusting the coverage ratio of the deposit also adjusts the equivalent uniform thickness and becomes a nonanalytical solution.

Automatic Pipe Edge Detection and Segmentation

Localization of the robot 100 in the pipe section requires registration to the open edge of the pipe. Other localization sensors on the robot, for example, the encoders in track modules 106, measure from start of movement or a fixed target, for example, from the target mounted on the launch rig for rangefinder 128. In one embodiment, the geometric profiling laser scanner 122 detects the transition from larger the pipe diameter (i.e., the external room) to pipe diameter inside the pipe and uses this transition at the top clocking angle of the pipe as the "start" of the pipe. The post-processing system then segments the pipe from this start position. It does this by segmenting the pipe, in one embodiment, into 1 foot sections, except for the last section which is the length of the robot's calibrated field of view, because this segment is measured statically before the robot begins the reverse traversal. Any modulo of the full pipe length is included in the penultimate segment, either as the modulus alone or as an addition to a 1 foot section for small moduli. In alternate embodiments, other lengths of pipe segments may be used.

Flag Clearing and Assistance in Subjective Review

The PPS automatically flags pipe segments or full batches are may not adhere to model assumptions or may have indications or robot or analysis failure. The system also provides multiple supplementary exhibits to aid in the subjective review of these flags, however. In one embodiment, these exhibits include heat maps of unwrapped pipe segments showing thickness of geometrically profiled deposit, high definition images from the robot's fisheye camera and visible white like LED array, and the actual spectra used in the computation of the measured isotope quantity. Other geometric modeling from the forward mapping sensor and additional sensor results could also be provided.

The disc-collimated radiometric method of the present invention is a novel method for in-pipe robotic assay of holdup deposits. By observing deposits from within pipes the method exploits the known cylindrical geometry to simplify collimation, calibration, and analysis. The method achieves high count rate due to preclusion of attenuation through pipe wall, proximity of detector to deposit, high emission of U-235 at 186 keV, and high efficiency of NaI detector counting at the 186 keV energy. Low energy radiation is efficiently attenuated by thin material, minimizing weight of the required collimators and facilitating robotic deployment. The sensing requires no moving parts, thereby enabling a mechanically robust system. By viewing the entire surface of interest with high energetic efficiency, the method exhibits high count rates and reliable statistics while operating at high rates of speed relative to all other techniques.

Automatic Analysis, Report Generation, and Interface and Database Integration After the robot 100 completes one or more pipe runs, log files for each run are transferred via USB stick to a post-processing server. On the server, software automatically extracts data from the log files. The post-processing software computes the robot localization. Each radiation measurement, geometry measurement, and visual image is associated with a distance. The pipe is automatically divided into segments. Conversion of raw spectra to grams of uranium-235 in a pipe segment is done. Geometric models of each pipe segment are computed and converted to height-map images. Quality control checks are computed, and flags are generated in the case of any failures.

Within a user interface, an analyst has the opportunity to review results, view supplemental exhibits such as images, height-maps, spectra, and plots of grams uranium-235 over distance. They must also use the interface to clear any generated flags before the pipe run can be locked for review by a program manager. When a program manager approves a pipe run, a final formatted PDF report can be generated detailing the results of the run.

Tablet-to-Robot-to-Analysis-to-Database Data Flow

The current embodiment of the system includes integration to enable tracking of key pipe data from tablet interface through robot and analysis to archiving and reporting. An example is a unique item ID number for a given pipe. This item ID is included in a measurement request that is downloaded onto an interface tablet. The item ID is then passed over WiFi to the robot when the run for that pipe is initiated. The robot publishes the item ID to its log file. When the robot completes its scan of the pipe, the log file is transferred via USB stick to a post-processing server. The item ID is extracted from the robot log file on the server, where it can be shown to an analyst. The item ID is stored with the data for that pipe run in a pipe run database, and it appears on a formatted, auto-generated PDF report detailing the pipe run results. Data about prior quality control checks and calibration runs are also recorded on the robot.

To those skilled in the art to which the invention relates, many modifications and adaptations of the invention will suggest themselves. Implementations provided herein, including sizes, shapes, ratings and specifications of various components or arrangements of components should be considered exemplary only and are not meant to limit the invention in any way. As one of skill in the art would realize, many variations on implementations discussed herein which fall within the scope of the invention are possible. Accordingly, the method and apparatus disclosed herein are not to be taken as limitations on the invention but as an illustration thereof.

We claim:

1. A method for assaying nuclear deposits in a pipe comprising:
    passing a collimated gamma detector through the pipe, the gamma detector collimated to receive gamma rays from a series of annular portions of the pipe;
    collecting a count of gamma rays received for a given time period from each of the series of annular portions of the pipe;
    localizing the location of the gamma detector during the collecting of the count of gamma rays; and
    coordinating the location of the gamma detector and the collected count of gamma rays such that, for any given annular portion of the pipe, the collected count of gamma rays is known;
    wherein the gamma detector is disposed between two lead discs having a diameter smaller than a diameter of the pipe; and
    wherein the lead discs provided a field of view defining an annular portion of the pipe for the gamma detector by blocking gamma rays from nuclear deposits on the pipe outside of the defined annular portion.

2. The method of claim 1 further comprising:
    calculating a mass of nuclear material within a particular annular portion of the pipe based on the collected count of gamma rays for the particular annular portion of the pipe.

3. The method of claim 2 wherein calculating the mass of nuclear material comprises taking a net count rate and multiplying by a constant representing the specific activity of the nuclear material and adjusting for calculated self-attenuation of the nuclear material.

4. The method of claim 1 wherein the field-of-view of the gamma detector defines a field of regard comprising an annular portion of the pipe emitting gamma rays which fully impinge on the gamma detector.

5. The method of claim 4 wherein the field-of-view further defines two regions of excess detection on either side of the field of regard comprising annular portions of the pipe emitting gamma rays which are partially blocked by collimating discs.

6. The method of claim 1 wherein the gamma detector and lead discs are coaxially aligned with the pipe as the gamma detector passes through the pipe.

7. The method of claim 1 wherein the gamma detector collects a first dataset comprising counts of gamma rays as it enters the pipe in a forward direction and a second dataset comprising counts of gamma rays as it exits the pipe in a reverse direction, further comprising comparing the first and second datasets for data quality purposes.

8. The method of claim 1 wherein the gamma detector is conveyed through the pipe by an autonomous robot.

9. A device for assaying nuclear deposits in a pipe comprising:
    a robot capable of traversing a length of the pipe; the robot comprising:
        a platform;
        a pair of track modules, attached to the platform, capable of conveying the platform in forward and reverse directions though the pipe, the track modules providing first location odometry;
        a laser rangefinder disposed on the rear of the platform providing second location odometry with respect to a target external to the pipe;
        a rotating planar laser range-scanner disposed on the rear of the platform for scanning in a plane perpendicular to an axis of the pipe; and
        a collimated gamma detector mounted on the robot.

10. The device of claim 9 wherein the collimated gamma detector comprises:
    a scintillation crystal disposed in a housing;
    two lead discs having the housing disposed therebetween, the lead discs coaxially aligned with the scintillation crystal.

11. The device of claim 9 further comprising:
    a pedestal disposed on the platform, wherein the gamma detector is mounted on the pedestal at a height such as to approximately coaxially align the gamma detector and the pipe.

12. The device of claim 9 wherein the first location odometry and the second location odometry are fused together combined to localize the robot within the pipe.

13. The device of claim 9 wherein the track modules are canted such as to be radially oriented to an interior wall of the pipe.

14. The device of claim 13 wherein the track modules are controlled such as to convey the robot at a constant speed in forward and reverse directions through the pipe, while preventing the gamma detector from becoming skewed with respect to the pipe.

15. The device of claim 9 further comprising:
    a camera disposed on a forward surface of the robot; and
    an illumination source illuminating the forward path of the robot;
    wherein the camera provides a visualization of the interior of the pipe.

16. The device of claim 9 further comprising an inertial measurement unit used to actively steer to the robot to the center of the pipe and to ensure that the robot stops before pitching above or below predetermined pitch bounds.

17. The device of claim 9 wherein the rotating planar laser range-scanner is used to determine the geometry of the nuclear deposits and to register the position of the robot at the start of the pipe.

18. The device of claim 9 further comprising:
    a processor;
    memory, storing computer instructions that, when executed by the processor, cause the device to:
        autonomously traverse the pipe in forward and reverse directions;
        position the gamma detector within the pipe; and
        collect and store coordinated localization data and readings from the gamma detector for later offloading.

* * * * *